Aug. 19, 1969  L. E. SWINNEY  3,461,811
MONORAIL SYSTEM
Filed Feb. 24, 1966  2 Sheets-Sheet 1
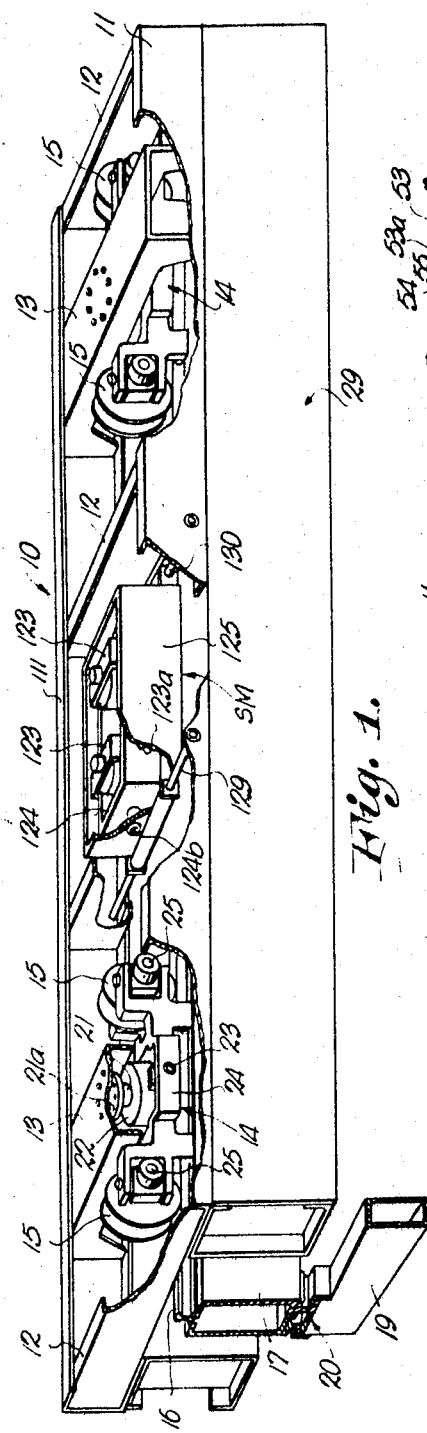
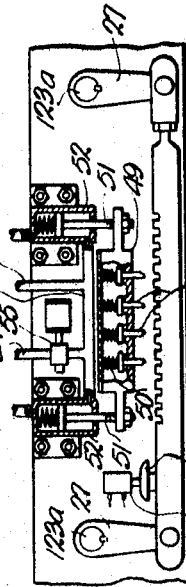
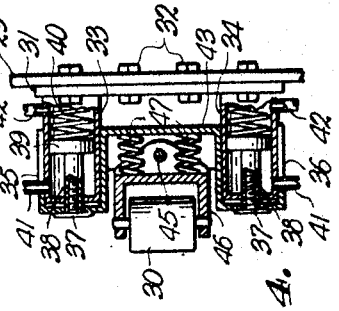
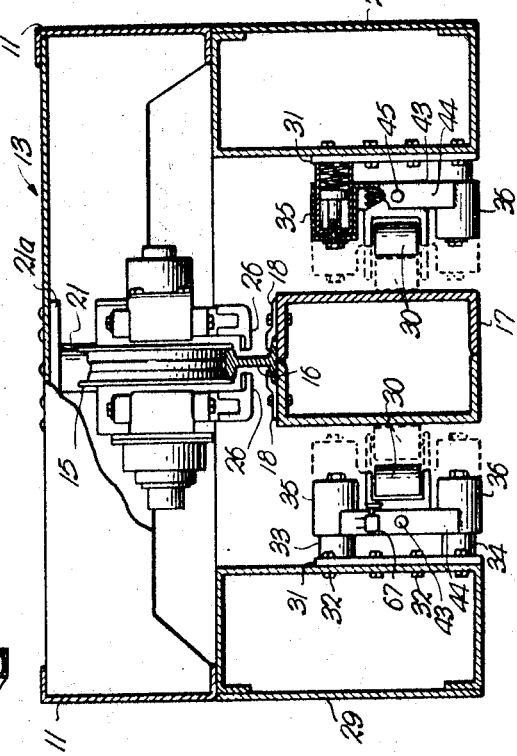
INVENTOR.
Louis E. Swinney
BY
Seyfield, Kokjer, Seyfield & Lowe
ATTORNEYS.

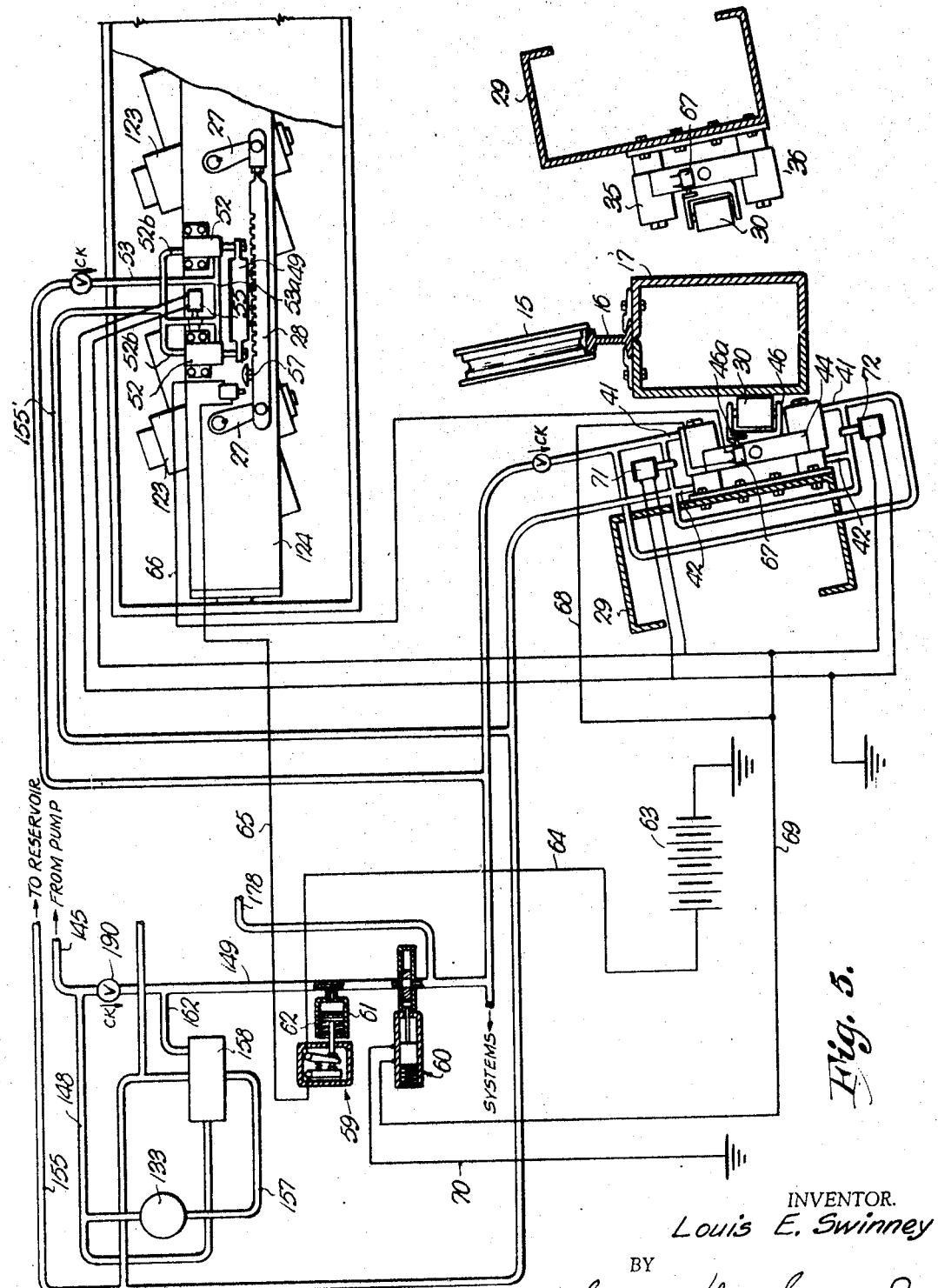

3,461,811
MONORAIL SYSTEM
Louis E. Swinney, Roeland Park, Kans., assignor, by mesne assignments, to Swinney-Ferreira, Gyrodynamics, Inc., Mission, Kans., a corporation of Missouri
Filed Feb. 24, 1966, Ser. No. 529,868
Int. Cl. G61b 13/06; E01b 25/08
U.S. Cl. 104—118                             10 Claims

ABSTRACT OF THE DISCLOSURE

A monorail vehicle is provided with a normally retracted safety support gear which, in response to certain failures in the vehicle stabilization means, is extended to engage the rail support and thereby prevent undesired tipping of the vehicle.

---

This invention relates generally to transportation equipment and deals more particularly with a monorail system comprising a combination of monorail vehicle and supporting structure therefor which provides substantial advantages in combining safety of operation with speed and passenger comfort. The invention has particular utility in monorail systems which utilize vehicles having stabilizing means incorporating the subject matter of my prior United States Letters Patent 3,124,007, issued Mar. 10, 1964.

One of the primary objects of the invention is to provide a monorail system employing an automatically stabilized vehicle and which includes means responsive to the condition of the automatic stabilizing system which will effect certain safety measures upon failure in the stabilization system or components thereof. In particular, a special feature of the invention resides in the provision of a safety system which produces a plurality of simultaneous effects, all of which together contribute toward maintaining the vehicle in operating position on the support rail therefor. In particular, one of the main features of the invention is to provide a monorail system in which the vehicle incorporates normally disengaged vehicle support or "safety" gear which upon failure in the stabilization system is actuated to provide supplemental support for the vehicle operable to prevent the vehicle from falling off the rail to either side.

Another object of the invention is to provide a system which incorporates means in which the occurrence of a failure in the stabilization system results in immediate application of restraint to the gyro supports, thus to prevents any further precession of the gyros. As a result, any precession forces following occurrence of the emergency are removed and the supplemental support gear will not be required to overcome such forces in maintaining the vehicle in or returning it to an upright attitude.

A further object of the invention is to provide a monorail system employing a processional gyro or gyros and which includes procession sensing means operable to trigger the safety support gear into the vehicle supporting condition upon excessive precession of the gyros.

Still another object of the invention is to provide a monorail system in which the safety support gear is brought into play upon excessive leaning or tipping of the vehicle to either side of the rail structure. A feature of the invention resides in the inclusion of means sensitive to the excessive leaning or tipping which will apply restraints to the gyros once the sensing means has been actuated and thus the removal of precession forces in resistance to the return of the vehicle to the upright condition.

Other and further objects of the invention together with the features of novelty appurtenant thereto will appear in the course of the following description.

In the accompanying drawings, which form a part of the specification and are to be read in conjunction therewith, and in which like reference numerals indicate like parts in the various views;

FIG. 1 is a schematic perspective view of the base frame or chassis of a preferred monorail vehicle and supporting structure assembly embodying the invention, parts being broken away and other parts shown in section for purposes of illustration;

FIG. 2 is an enlarged transverse sectional view taken generally along line 2—2 of FIG. 1 in the direction of the arrows;

FIG. 3 is an enlarged fragmentary side elevational view of the gyro locking mechanism, the hydraulic cylinders and lines being shown in schematic form;

FIG. 4 is an enlarged central vertical section through one of the emergency beamway engaging units forming part of the safety gear for the vehicle; and FIG. 5 is a schematic showing of the hydraulic and electric components of the system along with components of the vehicle and safety gear, the vehicle, to the extent it is shown, being shown in a sharply banked attitude on the track.

Referring to the drawings, and initially to FIG. 1, the basic vehicle frame or chassis, absent the normal superstructure, is indicated at 10. This chassis comprises the parallel side beams 11 which are joined at several points along their length by the cross beams 12 extending therebetween and secured at the ends thereto. Near the front end of the vehicle (which will be assumed as the left hand end, as viewed in FIG. 1) and the rearward end are the inverted transverse channel members 13 to each of which is centrally connected a wheel truck 14 having a pair of aligned peripherally grooved running wheels 15.

The wheels 15 run on a single rail 16 which in turn is supported along its length on the upper surface of a box girder 17. For the purposes of this application, girder 17 will be termed a beamway. The rail 16 can be clamped at intervals to the beamway by offset clamping members 18, as illustrated in FIG. 2.

The beamway 17 can be supported closely adjacent the ground on a roadway or in any other fashion desired. Most likely, it will be supported at a substantial elevation above the ground. For this purpose we have shown a typical cross beam 19 underlying the beamway and interconnected therewith by the joint 20. Such cross beams would be spaced along the beamway as necessary for adequate support and their ends would in turn be supported on piers (not shown) or other appropriate structural supports. The present invention is not concerned with the details of the beamway supporting means and accordingly no further description will be provided.

As we have earlier noted, the running gear for the vehicle comprises the trucks 14, each of which has two wheels 15 arranged in fore and aft relationship on opposite sides of the transverse support 13. Each truck includes a center post 21 having a flanged upper end 21a which is bolted to the horizontal web of the transverse member 13. A bearing block 22 is rotatably connected with the lower end of the post and this in turn carries oppositely extending trunnion pins as exemplified at 23 in FIG. 1. These pins are received in appropriate apertures in the opposite sides of a truck member 24 to which the wheels are connected for rotation on axes 25.

While the details of the truck may be varied, one important feature should be noted and that is that each includes near the lower side thereof inturned projections 26 (see FIG. 2) which are located below the upper flange of the rail 16. These projections are so formed that they will remain free from contact with the rail or any part thereof during normal operation of the vehicles. Their ends, however, are sufficiently closely spaced as to prevent the wheel from bouncing off the track. In other words, separation of the wheel in a vertical direction or sidewise from the upper surface of the track is limited by prospective engagement of the projections 26 with the underside of the flange, thus holding the trucks to the track at all times.

The vehicle 10 is fitted with a gyroscopically operated and controlled automatic stabilization system which is, in all important respects, the same as that disclosed in my aforesaid Letters Patent 3,124,007.

Located centrally of the illustrated vehicle is the gyro-gimbal component of the system; it is identified generally at SM. The illustrated stabilization system specifically differs from that disclosed in the aforesaid patent in that the illustrated system employs two gyros rather than one. In operation, however, the systems are identical. Therefore, to enable more ready understanding of the stabilization system insofar as it relates to the present invention, I have taken the liberty of utilizing the reference numerals employed in Patent 3,124,007 for the stabilization system, but increasing them by 100 so as to avoid confusion. For example, the inner gyro gimbal rings are indicated at 123 and the outer gimbal rings at 124. The gyros turn on vertical spin axes in the rings 123. The inner rings are pivoted on axes 123a to the outer ring 124. As seen in FIG. 3, the two inner gimbal rings 123 are linked for joint movement by means of arms 27 extending from their respective pivot shafts and an inner connecting link 28 pivoted to the distal ends of the arms. More will be said about this link 28 at a later point herein.

As can be seen from a study of Patent 3,124,007, the gyro units are utilized to stabilize the vehicle through a combination of gyro action and the shifting of the weight center of the vehicle by moving the entire gyro mass and its associated supporting structure transversely to one side or the other of the vehicle as necessary to meet unbalancing torque loads. The gyros and supporting gimbals are supported in a frame 125 to which the outer gimbal ring is connected by pivot pins located on axis 124b. The frame is mounted for side to side movement on rods 129, 130 extending between and secured to chassis sides 11. As can be seen from the aforesaid patent the sidewise movement is effected through cooperation between a double acting hydraulic cylinder 127 and a piston on rod 129.

Returning to further description of the basic vehicle structure, it will be observed that depending from the chassis on either side of the beamway 17 are elongate members 29 in the form of box-like structural units. These units 29 should be firmly and rigidly secured to the frame so as to substantially integral therewith. They can and will house the various power components required for operation of the vehicle and stabilization system, including also air conditioning and heating means. However, insofar as the present invention is concerned, a principal purpose is to serve as means for mounting safety devices on the vehicle which are operable to right the vehicle and maintain it in an upright condition in the event of any sort of failure in the stabilization system while the vehicle is moving, or for that matter, while it is at rest.

Referring to FIGS. 2 and 4, the safety gear includes two identical oppositely positioned safety device units, having a roller 30, one located on each side of the beamway. The rollers are preferably made of steel and are normally completely free from contact with the beamway, even during banking of the vehicle on turns. However, as will be seen, the construction is such that under certain conditions later to be described, the rollers will be extended into the broken line positions illustrated for them and thus into contact with the beamway to provide forces which return and/or maintain the vehicle in its proper upright condition on the track.

Referring more particularly to FIG. 4, which illustrates the basic construction of a typical safety unit in greater detail, each includes a base plate 31 which is bolted as at 32 to the rail confronting wall of a depending member 29. This plate has mounted directly upon it in firmly secured fashion two vertically spaced, inwardly projecting cylinders 33, 34, respectively. These cylinders are closed at their outer ends with the exception of an aperture through which a piston rod later to be described is received. Supported telescopically on cylinders 33 are large diameter upper and lower sleeves 35, 36, respectively. These sleeves are slidable in and out on the cylinders 33, 34. In addition, each has secured thereto, as by bolts 37, a piston rod 38 which is secured to a piston 39 inside the corresponding upper or lower cylinders 33, 34. Appropriate seals are provided around the rod 38 at its point of passage through the outside end wall of cylinders 33 or 34.

Located in each cylinder 33 or 34, between piston 39 and the plate 32 is a coiled compression spring 40 which is in compressed condition and thus biases the piston outwardly.

Hydraulic fluid flow lines 41, 42 are connected to the interior of the respective cylinders on opposite sides of the piston therein. As will subsequently be seen, fluid pressure is normally maintained constantly on the side supplied by line 41 with enough force to maintain coil compression springs 40 in the compressed condition. The outer sleeves 35 and 36 thus are maintained in retracted position on the inner cylinders by the fluid pressure.

It will be observed that the outer cylinders are interconnected by a central web 43 portion which has spaced inturned flanges 44 providing turnnion support for a cross pin 45 extending between the flanges 44. This pin pivotally mounts a yoke 46 which carries the earlier described roller 30 forming a part of the safety unit. The yoke 46 is stabilized in a centralized position relative the pivot axis by the compression springs 47 located on either side of the pivot pin axis.

Returning now again briefly to FIG. 3, it will be noted that the link 28 interconnecting the twin gyros is provided along its upper edge with a series of rack-like teeth with interspersed depressions. Poised thereabove are a plurality of spring loaded pins 48. The pins are carried in a hollow carrier structure 49, the pins projecting through spaced openings in the lower side of the carrier and having flanged interior ends against which compression springs 50 bear. The carrier has projections at its opposite ends which are connected with piston rods 51 projecting from the hydraulic cylinders 52. These cylinders are secured to the side of the gimbal ring 124. Pistons within the cylinders 52 are connected with the rods 51 and are normally held in the "up" position by hydraulic pressure supplied through a line 53, 53a, thereby maintaining internal compression springs 52a in a compressed condition. Hydraulic lines 52b are connected with the cylinders above the pistons and a return line 54 is controlled by a normally closed solenoid actuated valve 55. It will also be noted that a cam 57 is mounted on the upper edge of link 28. This cam normally depresses the spring loaded plunger of an electric switch 58, the purpose of which will be later described.

Referring now to FIG. 5, the main components of the hydraulic gyro motor system are shown at the upper left hand corner of FIG. 3, and as before, these components have been lifted intact from my earlier Patent 3,124,007. Upon comparison with FIG. 4 of that patent it will be seen that the gyro spinning motor is at 133. The main hydraulic line from the pump (not shown) is line 145. The hydraulically actuated components of the patent are supplied through line 149. For the purposes of the invention of this application, I have interposed a pressure sensing electric switch 59 and a spring biased normally open solenoid valve 60. The contacts of switch 59 are held normally closed by the plunger of a spring biased piston located in a cylinder 61 communicating with line 149.

Thus during normal operation, and so long as the force exerted on the piston by the pressure in the main hydraulic supply line 149 remains above the force of the biasing spring 62, the switch contacts of switch 59 will maintain the electrical circuit of which it is a part in closed condition. The strength of the biasing spring will be determined on the minimum pressure level necessary for safe operation.

The electric circuit of which switch 59 is a part comprises the battery 63, conductor 64 to the switch, a conductor 65 leading to the switch 58 on the gyro gimbal, a conductor 66 from that switch to a switch 67 on the safety gear, conductors 68 and 69, a solenoid valve 60, and ground conductor 70. Also energized by the aforementioned circuit are the normally closed spring biased solenoid valves 55, 71 and 72. These valves are of the type that remain closed so long as the solenoids are energized and open due to spring bias when deenergized. It will be understood that the hydraulic and electric components will be duplicated on the opposed safety gear units; they have been shown on only one.

In the normal running condition for the vehicle, the rollers 30 are in retracted position since retracting pressure is being applied through lines 41 to the cylinders 33, 34. The pin carrier 49 is also in the retracted or elevated position of FIG. 3 since pressure fluid is being applied to the pistons in the cylinders 52 through lines 53, 53a.

There are several different emergency conditions which bring the safety devices of the instant invention into play and they will be discussed one by one.

First, if the vehicle is moving along the track in either upright or banked condition, or even if it is standing still, loss of pressure in the main supply line 149, which would be the result of pump failure or breakdown of connections will result in opening of the pressure sensing switch 59. This breaks the circuit to solenoid valves 60, 55, 71 and 72, with the result that all further flow past valve 60 is stopped and since valves 71, 72 open, the lines 41 of the safety gear actuating cylinders 33, 34 are switched into communication with the main return line 155. Also, by opening of valve 55, line 53a to the cylinders 52 is switched to return line 155' and thus the main return line 155.

Upon opening of valves 71, 72 and the accompanying relief of pressure therethrough, the compressed springs 40 in the cylinders 33, 34 push the pistons 38 outwardly, thus to bring the rollers 30 into contact with the beamway and thereby provide stabilizing forces on the vehicle which either replace or supplement the gyro forces. The gyro is no longer necessary to maintain the vehicle upright and so long as the system remains in the "failure" condition it will be held upright. Once operating pressure is reestablished, all components will return to the original operating condition as will be evident.

Concurrently with the extension of the safety gear, the gyro gimbal rings 123 are locked against movement, thus to prevent further precession of the gyros and the consequent application of torque forces thereby on the vehicle. The opening of valve 55, which accompanies interruption of the electric circuit by opening of switch 59, relieves the fluid pressure acting upwardly against the springs in cylinders 52. Accordingly, the springs drive the carrier 49 downwardly to engage the pins 48 between the rack teeth on the link 28 thus to prevent any further movement of the link. This in turn locks crank arms 27 in fixed position, thus immobilizing the gimbal rings. Return of electric power to solenoid valve 55 which, as earlier noted, accompanies return of line pressure, will cause retraction of the carrier 49 and the pins thereby freeing the gyro gimbals for movement.

The foregoing operations take place whether the vehicle is moving or stationary and whether it is perfectly upright or leaning to either side. In the event the car is halted in a leaning condition as on a curve, the safety gear will bring it back into an upright condition. The safety gear and gyro locking mechanism can also be triggered into actuation by excessive gyro precession or by excessive leaning of the vehicle.

In the event of excessive gyro precession, the crank arms 27 will move link 28 longitudinally far enough in either direction to disengage cam 57 from the plunger of switch 58, as is shown in FIG. 5. This breaks the electrical circuit and thus results in extension of the safety gear and gimbal locking mechanism in the manner earlier described.

If the vehicle is leaned over sufficiently to bring either roller 30 into rolling contact with the beamway, a normally closed switch 67 located adjacent the roller support yoke is opened and the electric circuit is again interrupted with the attendant operation of the safety devices. Switch 67 is a plunger switch mounted on flange 44 of the roller mounting structure. Normally, the plunger is held in retracted switch closing position by the pressure exerted thereon by a projection 46a on the roller yoke which overlies and engages the end of the plunger. However, should the vehicle lean to the extent illustrated in FIG. 5, the roller will be sufficiently pivoted on its pin 45 as to permit outward movement of the plunger to the point where the switch is opened.

From the foregoing it will be seen that this invention is one well adapted to atain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. In a monorail system, the combination of
   a single rail,
   support means for said rail,
   a monorail vehicle having in-line wheels resting on said rail and an automatic stabilization system for maintaining the vehicle in an upright running position on the rail,
   safety gear units mounted on said vehicle on opposite sides of said rail having normally retracted elements permitting free movement of the vehicle along the rail, and
   safety gear extension means operable to effect simultaneous extension of said elements into vehicle supporting engagement with said support means in response to failures in said stabilization system.

2. The combination as in claim 1,
   said support means for the rail including an elevated beamway underlying said rail,
   said vehicle including structural members depending on opposite sides of said beamway,
   said safety units mounted on said depending members with said normally retracted elements confronting the sides of said beamway and extendable into contact therewith.

3. The combination as in claim 2,
   said normally retracted elements comprising roller members mounted for rotation on upright axes,
   said roller members operable to rotatably engage said beamway for rotation in the direction of travel of said vehicle upon extension of said elements.

4. The combination as in claim 1,
   said stabilization system including a gyro supported for precession,
   precession sensing means, and
   control means operable to actuate said safety gear extension means in response to excessive precession of said gyro.

5. The combination as in claim 4, including means operable to restrain further gyro precession during extension of said safety gear elements.

6. The combination as in claim 1,
said stabilization system including a hydraulic system,
said safety gear extension means including springs biasing said elements toward engagement with said support,
hydraulic retraction means normally overcoming the force of said springs, and
means operable to relieve the hydraulic pressure in said retraction means upon occurrence of a failure in said stabilization system.

7. The combination as in claim 1,
said extension means including vehicle attitude sensing means operable to effect said extension of said elements upon leaning of the vehicle to either side past a predetermined inclination relative to the horizontal.

8. The combination as in claim 7,
said sensing means including roller members mounted at the ends of said extension elements for pivotal movement with respect thereto, and
means responsive to pivoting of the roller axes caused by engagement of the rollers with the support means upon said leaning of said vehicle.

9. The combination as in claim 1,
said stabilization system including an hydraulic system, and
hydraulic pressure sensing means operably connected with said system and said extension means and operable to effect said extension of said elements in response to a decrease in hydraulic pressure in said system below a preselected value.

10. The combination as in claim 9,
said stabilization system including a gyro supported for free precession, and
gyro precession restraint means normally ineffective to restrain the precession,
said pressure sensing means operably connected also with said restraint means and effective to engage same with the gyro mechanism upon said pressure decrease.

References Cited

UNITED STATES PATENTS

| | | | |
|---|---|---|---|
| 1,454,804 | 5/1923 | Wright | 104—119 |
| 1,947,119 | 2/1934 | Walter | 105—141 |
| 2,178,351 | 10/1939 | Tetens | 105—141 |
| 3,001,484 | 9/1961 | Bingham | 104—120 |

ARTHUR L. LA POINT, Primary Examiner

R. A. BERTSCH, Assistant Examiner